United States Patent
Schuller et al.

(10) Patent No.: US 10,265,941 B2
(45) Date of Patent: Apr. 23, 2019

(54) HEATED AIR SYSTEM FOR 3D PRINTER

(71) Applicant: Stratasys, Inc., Eden Prairie, MN (US)

(72) Inventors: Peter D. Schuller, Elko, MN (US); Jordan Paul Nadeau, St. Louis Park, MN (US); Joel Ordell Ostby, Edina, MN (US); Shawn Michael Koop, Blaine, MN (US)

(73) Assignee: Stratasys, Inc., Eden Prairie, MN (US)

( * ) Notice: Subject to any disclaimer, the term of this patent is extended or adjusted under 35 U.S.C. 154(b) by 68 days.

(21) Appl. No.: 15/237,380

(22) Filed: Aug. 15, 2016

(65) Prior Publication Data

US 2018/0043632 A1 Feb. 15, 2018

(51) Int. Cl.
| | |
|---|---|
| *B29C 67/00* | (2017.01) |
| *B33Y 30/00* | (2015.01) |
| *B33Y 10/00* | (2015.01) |
| *B29C 64/295* | (2017.01) |
| *B29C 64/118* | (2017.01) |

(52) U.S. Cl.
CPC .......... *B33Y 30/00* (2014.12); *B29C 64/295* (2017.08); *B33Y 10/00* (2014.12); *B29C 64/118* (2017.08)

(58) Field of Classification Search
CPC .... B29C 64/106; B29C 64/118; B29C 64/295
See application file for complete search history.

(56) References Cited

U.S. PATENT DOCUMENTS

| | | |
|---|---|---|
| 5,866,058 A | 2/1999 | Batchelder et al. |
| 6,004,124 A | 12/1999 | Swanson et al. |
| 6,722,872 B1 | 4/2004 | Swanson et al. |
| 7,063,285 B1 | 6/2006 | Turley et al. |
| 7,127,309 B2 | 10/2006 | Dunn et al. |
| 7,604,470 B2 | 10/2009 | LaBossiere et al. |
| 7,625,200 B2 | 12/2009 | Leavitt |
| 7,938,356 B2 | 5/2011 | Taatjes et al. |
| 8,403,658 B2 | 3/2013 | Swanson |
| 8,439,665 B2 | 5/2013 | Batchelder et al. |
| 8,985,497 B2 | 3/2015 | Mannella et al. |
| 9,073,263 B2 | 7/2015 | Mannella et al. |
| 9,108,360 B2 | 8/2015 | Comb et al. |

(Continued)

FOREIGN PATENT DOCUMENTS

WO 2016014543 A1 1/2016

*Primary Examiner* — James Sanders
(74) *Attorney, Agent, or Firm* — Peter J. Ims; Westman, Champlin & Koehler, P.A.

(57) ABSTRACT

An apparatus and a method using the apparatus provides heated air in an additive manufacturing process for building a three-dimensional part. The method comprises providing a stream of flowable part material at an initial build level, the initial build level being positioned in and defining a horizontal plane wherein the stream of flowable material is being initially disposed on previously deposited part material. Heated air is provided at a selected temperature corresponding to the temperature of the stream of flowable part material such that the stream of flowable part material deposits on previously deposited part material in an adhering fashion thereby forming the three-dimensional part wherein the heated air is provided in the horizontal plane of the initial build level.

15 Claims, 6 Drawing Sheets

(56) References Cited

U.S. PATENT DOCUMENTS

| | | | |
|---|---|---|---|
| 2004/0104515 A1* | 6/2004 | Swanson | B29C 41/36 |
| | | | 264/497 |
| 2015/0096717 A1 | 4/2015 | Batchelder et al. | |
| 2015/0097053 A1 | 4/2015 | Batchelder et al. | |
| 2015/0097308 A1* | 4/2015 | Batchelder | B29C 67/0055 |
| | | | 264/40.6 |
| 2016/0214175 A1* | 7/2016 | Nordstrom | B22F 3/1055 |

* cited by examiner

HEATED AIR SYSTEM FOR 3D PRINTER

BACKGROUND

This disclosure generally relates to a device and method for controlling build chamber temperature, and more specifically controlling build chamber temperature in a device and system for three-dimensional fabrication.

Additive manufacturing, also called 3D printing, is generally a process in which a three-dimensional (3D) object is built by adding material to form a 3D part rather than subtracting material as in traditional machining. One basic operation of an additive manufacturing system consists of slicing a three-dimensional computer model into thin cross sections, translating the result into two-dimensional position data, and feeding the data to control equipment which manufacture a three-dimensional structure in an additive build style. Additive manufacturing entails many different approaches to the method of fabrication, including fused deposition modeling, ink jetting, selective laser sintering, powder/binder jetting, electron-beam melting, electrophotographic imaging, and stereolithographic processes. Using one or more additive manufacturing techniques, a three-dimensional solid object of virtually any shape can be printed from a digital model of the object by an additive manufacturing system, commonly referred to as 3D printer.

In a fused deposition modeling additive manufacturing system, a printed part may be printed from a digital representation of the printed part in an additive build style by extruding a flowable part material along toolpaths. The part material is extruded through an extrusion tip carried by a print head of the system, and is deposited as a sequence of roads onto a substrate. The extruded part material fuses to previously deposited part material, and solidifies upon a drop in temperature. In a typical system where the material is deposited in planar layers, the position of the print head relative to the substrate is incremented along an axis (perpendicular to the build plane) after each layer is formed, and the process is then repeated to form a printed part resembling the digital representation.

In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited from a second nozzle pursuant to the generated geometry during the printing process. The support material adheres to the part material during fabrication, and is removable from the completed printed part when the printing process is complete.

Some 3D manufacturing systems such as a FDM® fused deposition modeling 3D printers manufactured and sold by Stratasys, Inc. of Eden Prairie, Minn. use a heated build chamber in order to mitigate thermal stresses and other difficulties that arise from the thermal expansion and contraction of build materials during fabrication, using methods such as are disclosed in U.S. Pat. No. 5,866,058. Certain of these systems have limited power input to provide heat for extrusion while also providing heat to the build chamber. Such systems are commercially sold to operate at 15 amp and 120 volts which is the typical household electrical standard in the United States. Thus the thermal environment of the heated build chamber needs to be regulated more efficiently to meet such operating power limitations to supply the needed heat at the build plane while also maintaining a thermal profile conducive to the multiple layers of build already produced and cooling in a manner that avoids deformation of the part being built and provides for the desired incremental cooling of the build.

SUMMARY

In one aspect, this disclosure includes a method of providing heated air in an additive manufacturing process in a 3D printer for building a 3-dimensional part. The method comprises providing a stream of flowable part material at an initial build level, the initial build level being positioned in and defining a horizontal plane wherein the stream of flowable material is being initially disposed on previously deposited part material. The method further includes providing heated air at a selected temperature corresponding to the temperature of the stream of flowable part material such that the stream of flowable part material deposits on previously deposited part material in an adhering fashion thereby forming the 3-dimensional part wherein the heated air is provided substantially in the horizontal plane of the initial build level.

In another aspect, this disclosure includes an apparatus for providing heated air in a 3D printer for building a 3-dimensional part wherein the apparatus comprises a chamber having a platen on which a stream of flowable part material is to be initially deposited at an initial build level. The platen is movable in a substantially vertical direction while a stream of flowable part material is being disposed thereon wherein the initial build level defines a substantially horizontal print plane. A source for supplying and heating air is positioned such that heated air is supplied to the chamber in the substantially horizontal build plane and flows across the chamber in the substantially horizontal build plane.

DEFINITIONS

Unless otherwise specified, the following terms as used herein have the meanings provided below:

The term "polymer" refers to a polymerized molecule having one or more monomer species, and includes homopolymers and copolymers.

The terms "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the inventive scope of the present disclosure.

The terms "at least one" and "one or more of" an element are used interchangeably, and have the same meaning that includes a single element and a plurality of the elements, and may also be represented by the suffix "(s)" at the end of the element.

The terra "providing", such as for "providing a support material", when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments.

The use of any and all examples, or exemplary language ("e.g.," "such as," or the like) provided herein, is intended merely to better illuminate the embodiments and does not pose a limitation on the scope of the embodiments.

No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms.

BRIEF DESCRIPTION OF THE DRAWINGS

The foregoing and other objects, features and advantages of the invention will be apparent from the following description of particular embodiments thereof, as illustrated in the accompanying drawings. The drawings are not necessarily to scale, emphasis instead being placed upon illustrating the principles of the devices and methods described herein.

DESCRIPTION

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The system of this disclosure is particularly useful in an apparatus that builds three-dimensional objects in a heated environment using a fused deposition process. However, other processes are also includable within the scope of this disclosure in which the system is power limited as explained further below.

Figure 1:
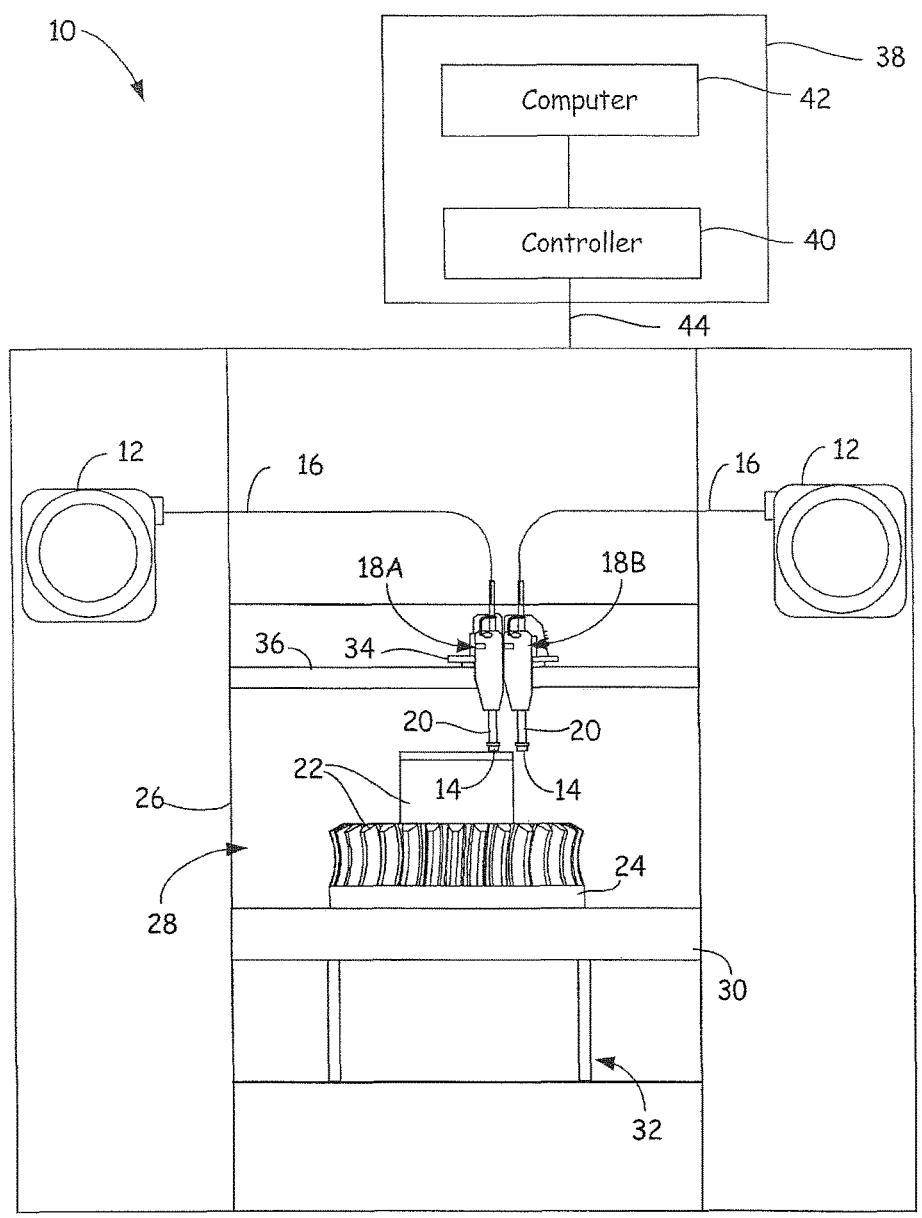
FIG. 1 is a front view of a 3D printer configured to print printed parts and support structures.

The present disclosure may be used with any suitable extrusion-based additive manufacturing system. For example, FIG. 1 illustrates a 3D printer 10 that has a substantially horizontal print plane where the part being printed is indexed in a substantially vertical direction as the part is printed in a layer by layer manner using two print heads 18A, 18B. The illustrated 3D printer 10 uses two consumable assemblies 12, where each consumable assembly 12 is an easily loadable, removable, and replaceable container device that retains a supply of a consumable filament for printing with 3D printer 10. Typically, one of the consumable assemblies 12 contains a part material filament, and the other consumable assembly 12 contains a support material filament, each supplying filament to one print head 18A or 18B. However, both consumable assemblies 12 may be identical in structure. Each consumable assembly 12 may retain the consumable filament on a wound spool, a spoolless coil, or other supply arrangement, such as discussed in Swanson et al., U.S. Pat. No. 8,403,658; Turley et al. U.S. Pat. No. 7,063,285; Taatjes at al., U.S. Pat. No. 7,938,356; and Mannella et al., U.S. Pat. Nos. 8,985,497 and 9,073,263.

Each print head 18A and 18B is an easily loadable, removable and replaceable device comprising a housing that retains a liquefier assembly 20 having a nozzle tip 14. Each print head 18A and 18B is configured to receive a consumable material, melt the material in liquefier assembly 20 to produce a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tube 16 interconnects consumable assembly 12 and print head 18A or 18B, where a drive mechanism of print head 18A or 18B (or of 3D printer 10) draws successive segments of the consumable filament from consumable assembly 12, through guide tube 16, to liquefier assembly 20 of print head 18A or 18B. In this embodiment, guide tube 16 may be a component of 3D printer 10, rather than a sub-component of consumable assemblies 12. In other embodiments, guide tube 16 is a sub-component of consumable assembly 12, and may be interchanged to and from system 10 with each consumable assembly 12. During a build operation, the successive segments of consumable filament that are driven into print head 18A or 18B are heated and melted in liquefier assembly 20. The melted material is extruded through nozzle tip 14 in a layer wise pattern to produce printed parts.

3D printer 10 prints 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include fused deposition modeling 3D printers developed by Stratasys, Inc., Eden Prairie, Minn. under the trademarks "FDM".

As shown, 3D printer 10 includes system casing 26, chamber 28, platen 30, platen gantry 32, head carriage 34, and head gantry 36. System casing 26 is a structural component of system 10 and may include multiple structural sub-components such as support frames, housing walls, and the like. In some embodiments, system casing 26 may include container bays configured to receive consumable assemblies 12. In alternative embodiments, the container bays may be omitted to reduce the overall footprint of 3D printer 10. In these embodiments, consumable assembly 12 may stand proximate to system casing 26, while providing sufficient ranges of movement for guide tubes 16 and print heads 18 that are shown schematically in FIG. 1.

Chamber 28 is an enclosed environment that contains platen 30 for printing 3D part 22 and support structure 24. Chamber 28 may be heated (e.g., with circulating heated air) to reduce the rate at which the part and support materials solidify after being extruded and deposited (e.g., to reduce distortions and curling). In alternative embodiments, chamber 28 may be omitted and/or replaced with different types of build environments. For example, 3D part 22 and support structure 24 may be built in a build environment that is open to ambient conditions or may be enclosed with alternative structures (e.g., flexible curtains).

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18A and 18B, and is supported by head gantry 36. Head carriage 34 preferably retains each print head 18A and 18B in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner).

In the shown embodiment, head gantry 36 is a robotic mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also support deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18A and 18B) may be configured to move along the z-axis. Other similar arrangements may also be used such that one or both of platen 30 and print heads 18A and 18B are moveable relative to each other. Platen 30 and head carriage 34 (and print heads 18A and 18B) may also be oriented along different axes. For example, platen 30 may be oriented vertically and print heads 18A and 18B may print 3D part 22 and support structure 24 along the x-axis or the y-axis.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18A and 18B, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18A and 18B) around in the horizontal x-y plane above chamber 28. Controller assembly 38 may also direct print heads 18A and 18B to selectively draw successive segments of the consumable filaments from consumable assembly 12 and through guide tubes 16, respectively.

While, FIG. 1 illustrates an additive manufacturing system, commonly referred to as a 3D printer, 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1

The build chamber of this disclosure is particularly suitable for fused deposition modeling 3D printers that have been made for 15 amp service (at approximately 110-120 volts alternating current (vac)) which is a typical electrical outlet in a U.S. home. This power limitation for a fused deposition modeling 3D printer must supply power to both run and heat the print head, to heat the build chamber and provide power to the various other powered components of the system. In view of this input power limitation, it is desirable to make all the components as efficient as possible in terms of power consumption.

Figure 2:
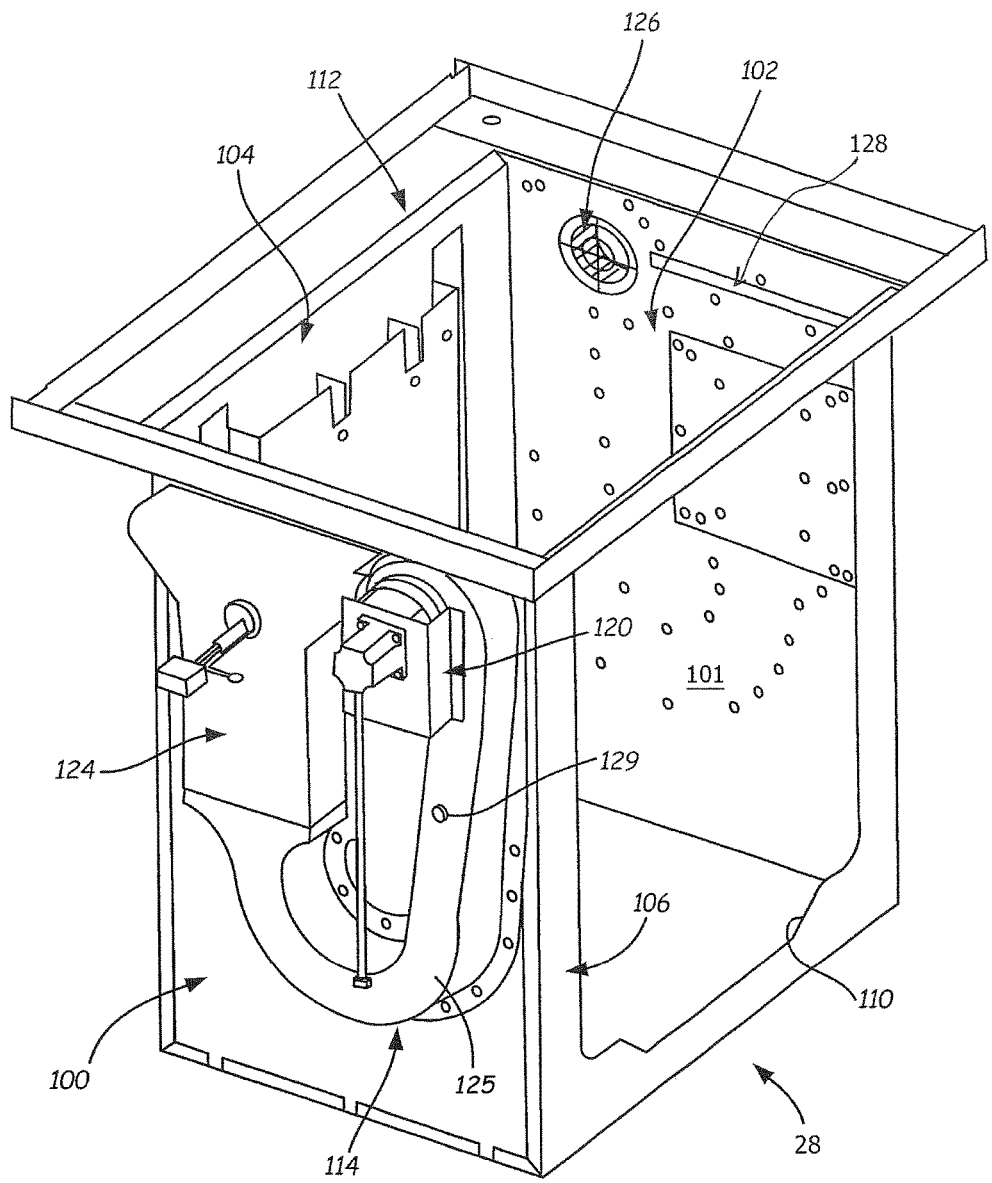
FIG. 2 is perspective view of the chamber of this disclosure.
Figure 3:
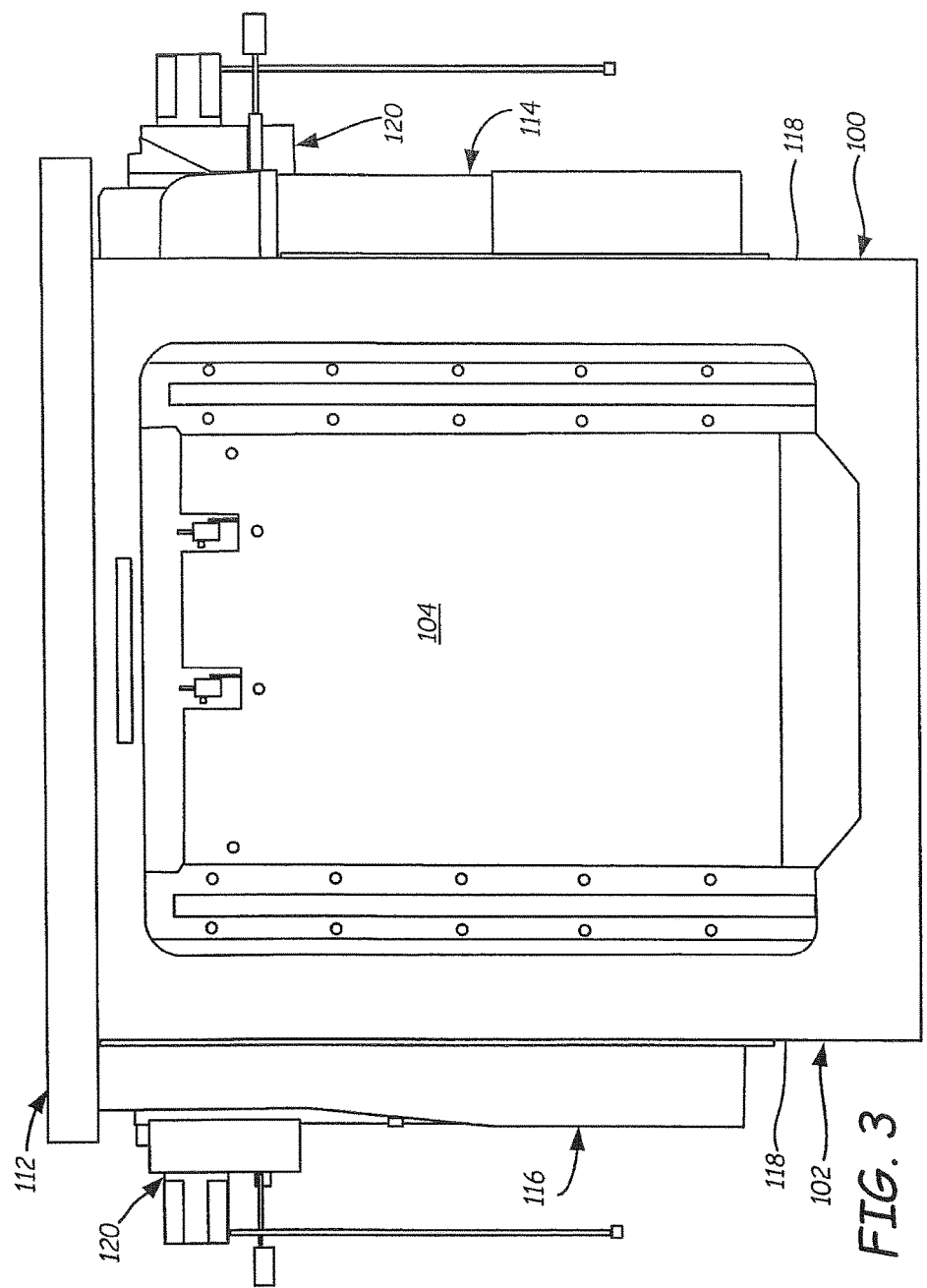
FIG. 3 is an elevation view of the chamber illustrating the air intake and exhaust systems of this disclosure.
Figure 4:
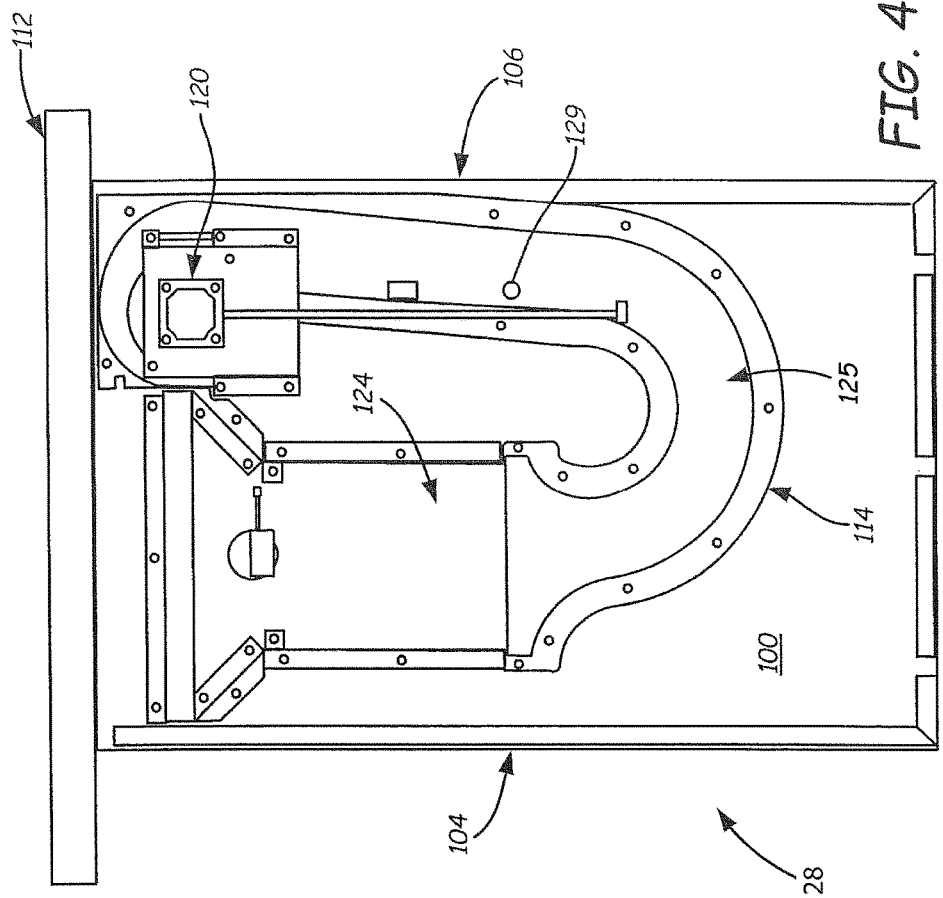
FIG. 4 is an elevation view illustrating one of the air intake and exhaust systems.

As illustrated in FIG. 2, heated air according to this disclosure is provided within chamber 28 in a unique, energy efficient manner. The chamber 28 has an interior 101 defined by four walls, two opposing side walls 100 and 102, a back wall 104 and a front wall 106. The front wall 106 has a door (not shown) that is removable or positioned on a hinge mechanism for providing access into the interior 101 through door opening 110. The print heads 18A and 18B are positioned at the top 112 of the chamber 28, the print heads 18A and 18B not shown for clarity in FIG. 2 but illustrated in position in FIG. 1.

Figure 5:
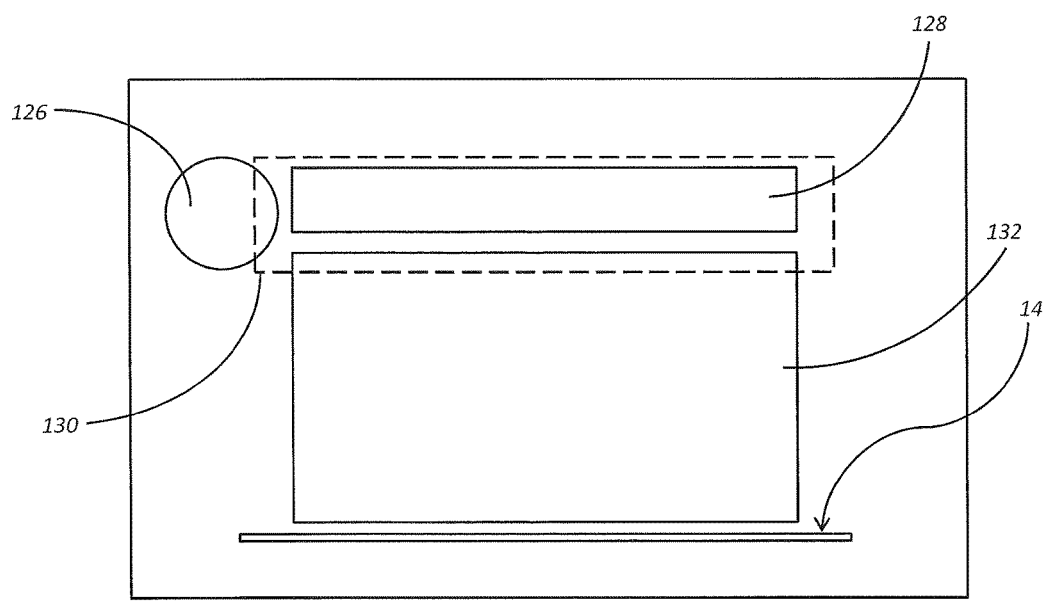
FIG. 5 is a schematic view of the intake and exhaust port position in relation to the print plane.

Air intake and exhaust systems 114 and 116 are positioned on exterior sides 118 of opposing side walls 100 and 102. Only one air intake and exhaust system 114 will be described since both air intake and exhaust systems 114 and 116 are identical in construction. The air intake and exhaust system 114 includes a blower motor and blower 120 that directs air through ductwork 125 to a heating element 124. Sidewalls 100 and 102 both include an intake port 126 and exhaust port 128 disposed in sidewalls 100 and 102 such that intake port 126 provides access to air for blower motor and blower 120 and exhaust port 128 provides access for air heated by the heating element 124 into the interior 101 of the chamber 28. A temperature sensor 129 is provided in the ductwork 125 which governs the amount of heat produced by the heating element 124, thereby controlling the temperature of the heated air to be provided into the chamber 28. The exhaust ports and the intake ports are positioned at about the build plane 130 as illustrated in FIG. 5.

Figure 7:
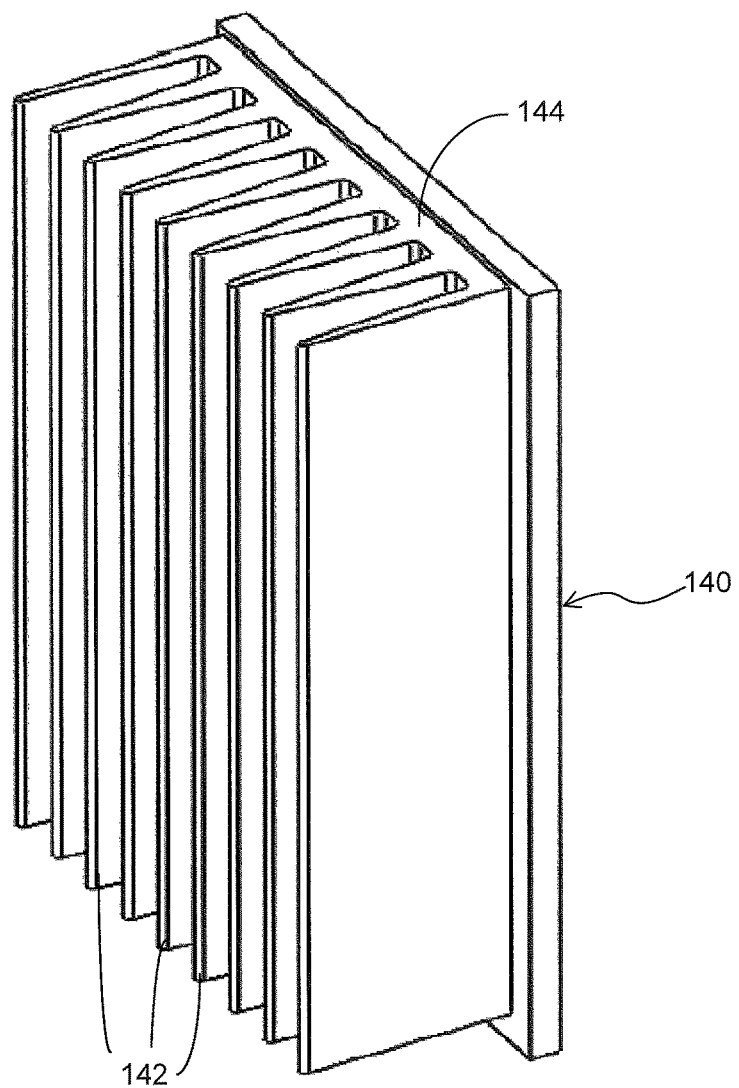
FIG. 7 is a perspective view of a heat sink of this disclosure.

The heating element 124 includes a heating component that provides a low temperature gradient in the range of approximately 200-300° F. One preferred heating component is a Mica heating element. Other suitable heating elements include a Kapton® heating element which is a polyimide obtainable from E.I. du Pont de Nemours and Company of Wilmington Del., and a silicone heating element. Other suitable materials are those in which a current flowing through the material results in the resistivity of the material increasing rapidly, thereby producing a desired heat output at a lower material temperature. For example, the Mica heating element of this disclosure produces sufficient heat at a temperature range of approximately 200-300° F. One other aspect of the heater of this disclosure is that the heating element is attached (conducts heat) to a heat transfer element having a large surface area. For example, an aluminum heat sink having approximately at least 150 square inches of surface area and in one example was 150 to 160 square inches of surface area was found to be very suitable for providing sufficient heat to the air flowing into the chamber 12. An exemplary heat sink of this disclosure is illustrated in FIG. 7 at 140. The heat sink is made of aluminum and includes a plurality of fins 142 attached integral with a wall 144. The blower motor and blower 120 includes a fan of a squirrel cage configuration approximately 3 inches in diameter and ½ inch in depth.

Figure 6:
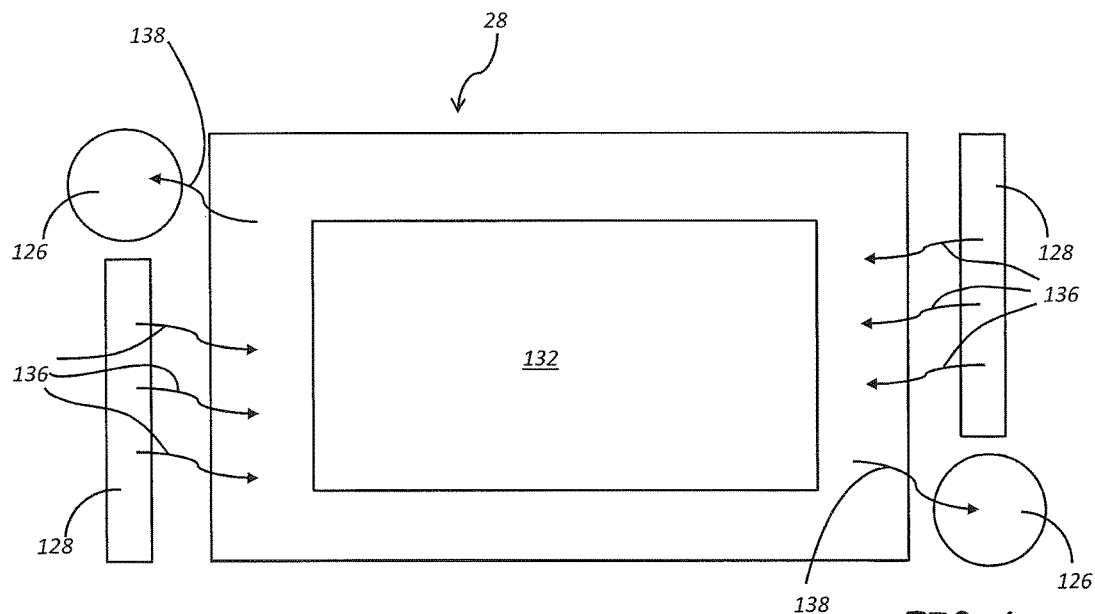
FIG. 6 is a schematic view of the chamber illustrating air flow.

In addition, both the exhaust ports 128 and the intake ports 126 of each sidewall 100 and 102 are located in substantially the same horizontal plane and are positioned in opposing sidewalls, with intake ports 126 being disposed in diagonally opposed positions on their respective sidewalls. The combination of heated air being provided via the diagonally positioned intake ports 126 positioned on opposing sidewalls and positioned in the same horizontal plane as the build plane 130 (shown in broken lines) along with the outlet ports also being positioned on opposing sidewalls in the same horizontal plane provides heated air to the build plane 130 in a very efficient manner as best illustrated in FIGS. 5 and 6. Preferably the air intake and exhaust systems 114 and 116 are the only sources of heated air for the chamber 28. One reason for this preference is that the disclosure herein is especially suitable for those additive manufacturing systems that are power limited such as for 15 amp service at 110-120 vac.

In addition, the heated air being provided to the build plane 130 as indicated by arrows 136 is recirculated back into the air intake and exhaust systems 114 and 116 as shown by arrows 138. The air is reheated to a set point temperature selected for the particular polymer being used to build the part. It is also preferred that the air is circulated at a gentle rate so that the air circulation does not affect the part being built. It will be appreciated that the air is being circulated at the build plane 130 and the part being built 132 has not completely solidified. A strong air flow may deform the part 132 at that point, and may also disturb the thermal temperature gradient, causing an increased need for additional heating energy to be drawn and exceed the 15 Amp power limitation. In one example in which the platen was approximately 14 inches in width, the air flow was approximately 2.5 meters per second at the exhaust port 128. One goal of the air movement is to provide as uniform a temperature as possible throughout the area of the level at which the build is being initiated 130. Recirculating and thereby reheating the air provides further energy efficiency since air does not have to be heated from an ambient temperature.

It has also been discovered that providing the heated air and exhausting such air at approximately the same horizontal plane at about the build plane 130, provides a decreasing temperature profile downwardly along the part 132 sufficient to permit proper cooling of the part being built. If the temperature profile within the chamber 28 is not appropriate for the polymer being used to build the part, then the underlying structure may result in deformation.

As discussed above, the 3D part is manufactured in a layerwise manner by extruding a flowable part material along tool paths. The part material is extruded and is deposited as a sequence of roads on a substrate in substantially an x-y plane. The extruded part material fuses to previously deposited part material, and solidifies upon a drop in temperature. As roads of polymer are added, the platen is lowered, thereby moving the part to a cooler temperature zone of the chamber. A decrease in temperature downwardly along the part 132 being built facilitates proper solidification of the underlying previously extruded roads while additional extruded roads are being added on top. The incremental cooling found in the downward thermal profile of this disclosure is aided by the air recirculation at the build plane 130. Recirculating the air with a goal to minimize any heated air from flowing downward within the chamber 28 along the part 132 being built helps provide the decreasing temperature profile which in turn provides the appropriate solidification of the build material. No additional heating or cooling has been found to be necessary using the system of this disclosure.

In addition, although the embodiment of the chamber 28 is illustrated in the drawings as an enclosure, this is not necessary. For other applications, the chamber 28 may be open (without a door) or even without a back wall or complete sidewalls. Providing heated air only at the build plane 130 in the manner herein described has been found to be the important factor.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A method of providing heated air in an additive manufacturing process for building a 3D part, the method comprising:

providing a stream of flowable part material in a build plane, the initial build level being positioned in and defining a horizontal plane wherein the stream of flowable material is being initially disposed on previously deposited part material; and providing heated air at a selected temperature corresponding to the temperature of the stream of flowable part material such that the stream of flowable part material deposits on previously deposited part material in an adhering fashion thereby forming the 3-dimensional part wherein the heated air is provided in the horizontal plane of the initial build level utilizing intake ports of two sources that are positioned diagonally on the oppositely facing sidewalls of the housing, and wherein the outlet ports of the two sources are positioned diagonally on the oppositely facing sidewalls of the housing such that the air circulation is substantially horizontal.

2. The method of claim 1 wherein the stream of flowable part material at an initial build level is within an enclosure and exhausting the heated air from the enclosure at the horizontal plane of the initial build level.

3. The method of claim 2 wherein substantially all of the heated air being provided is exhausted at the horizontal plane of the initial build level.

4. The method of claim 3 wherein an air blower and heater for each of the two sources are positioned on the enclosure and further comprising reheating the exhausted air to the selected temperature and providing the reheated air to the stream of flowable part material at an initial build level.

5. The method of claim 4 and further monitoring air temperature of the exhausted air prior to reheating and reheating the air based on the monitoring air temperature.

6. The method of claim 3 wherein a decreasing vertical air temperature profile develops along the 3-dimensional part being built.

7. The method of claim 1 and further comprising:
providing electrical power through a 15 ampere power supply for providing power to heat the air and to provide power to form the stream of flowable part material.

8. An apparatus for providing heated air in an additive manufacturing process for building a 3D part, the apparatus comprising:
a housing;
a substantially horizontal platen disposed within the housing on which melt extruded build material is to be deposited in layers to form a 3D part, the platen having an initial raised position at a predetermined, fixed build plane within the housing, the platen being movable in a downward substantially vertical direction as subsequent layers of melt extruded build material are deposited thereon, wherein each subsequent layer is deposited in the build plane while the previously deposited layers move away from the build plane as the platen is lowered; and two sources for supplying and heating air, the two sources positioned on opposite facing sidewalls of the housing, each source comprising an intake port and exhaust port, a blower, a heating element for heating air, and ductwork for providing a passage for airflow from the intake port to the exhaust port and past the heating source, wherein the intake port and exhaust port are each positioned in or above the build plane such that heated air is introduced and recirculated in the build plane where layers of melt extruded build material are to be deposited, wherein intake ports of the two sources are positioned diagonally on the oppositely facing sidewalls of the housing, and wherein the outlet ports of the two source are positioned diagonally on the oppositely facing sidewalls of the housing such that the air circulation is substantially horizontal.

9. The apparatus of claim 8 and further comprising a temperature sensor provided in the ductwork in each of the two sources and configured to govern the amount of heat produced by the heating element in each of the two sources, thereby controlling the temperature of the heated air to be provided to the build plane.

10. The apparatus of claim 9 wherein the ductwork in each of the two sources has a U-shaped configuration.

11. The apparatus of claim 8 wherein the two sources for supplying and heating air are the only heating sources for supplying heated air to the interior of the housing.

12. The apparatus of claim 8 and further comprising a 15 ampere power supply for supplying power to the apparatus.

13. The apparatus of claim 12 wherein the heating element for each of the two sources provides heat at a temperature range of approximately 200 to 300° F.

14. The apparatus of claim 13 wherein the heating element for each of the two sources comprises mica, silicone, or a polyimide.

15. The apparatus of claim 13 and wherein each of the two sources for supplying and heating air further comprises a heat sink of at least approximately 150 square inches of surface area attached to the heating element.

\* \* \* \* \*